(12) United States Patent
Lee

(10) Patent No.: US 7,012,739 B2
(45) Date of Patent: Mar. 14, 2006

(54) DOUBLE-PASS POLARIZATION-INDEPENDENT SIGNAL PROCESSOR AND ON-AXIS PROCESSING METHOD

(75) Inventor: Gregory S. Lee, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 335 days.

(21) Appl. No.: 10/410,185

(22) Filed: Apr. 10, 2003

(65) Prior Publication Data

US 2004/0201880 A1 Oct. 14, 2004

(51) Int. Cl.
*G02F 1/35* (2006.01)
*G02B 27/28* (2006.01)

(52) U.S. Cl. ...................................... 359/326; 359/497

(58) Field of Classification Search ......... 359/326–332, 359/494–497, 499, 501; 385/11, 15; 398/152
See application file for complete search history.

(56) References Cited

U.S. PATENT DOCUMENTS

| | | | |
|---|---|---|---|
| 4,868,515 A | * | 9/1989 | Reintjes et al. ............. 359/349 |
| 4,958,908 A | | 9/1990 | Rockwell et al. |
| 2002/0179912 A1 | | 12/2002 | Batchko et al. |
| 2004/0150876 A1 | * | 8/2004 | Dagenais et al. ........... 359/344 |

FOREIGN PATENT DOCUMENTS

JP        2001127316        4/2001

* cited by examiner

*Primary Examiner*—John D. Lee (57) ABSTRACT

An apparatus includes a polarization beam splitter, at least two reflectors and first and second polarization rotation devices. The polarization beam splitter and the at least two reflectors are arranged in a loop that is capable of propagating a clockwise signal component and a counterclockwise signal component. The first polarization rotation device is located in the loop between the polarization beam splitter and a first reflector of the at least two reflectors. The second polarization rotation device is located in the loop between the polarization beam splitter and an additional reflector of the at least two reflectors. The first polarization rotation device includes a serial arrangement of a reciprocal rotator and a nonreciprocal rotator.

28 Claims, 6 Drawing Sheets

DOUBLE-PASS POLARIZATION-INDEPENDENT SIGNAL PROCESSOR AND ON-AXIS PROCESSING METHOD

BACKGROUND OF THE INVENTION

1. Field of the Invention

The present invention relates to an apparatus to process an arbitrarily polarized source signal. In particular, the invention relates to an apparatus to separate an arbitrarily polarized signal into two components and then align the polarizations of the components for processing. Exemplary applications include mixing the polarization aligned signal components in a nonlinear crystal with a pump signal having a predetermined polarization.

2. Description of Related Art

Nonlinear wavelength conversion can be used to measure very high-speed signals in an optical sampling oscilloscope. Nonlinear conversion crystals typically require specific polarizations of the source signal and the pump signal, and the crystals produce a sum frequency generation (SFG) signal having the same polarization orientation. Whereas the pump signal, being part of the instrument, can always be polarized correctly, the source signal (i.e., the user's input signal) may have unknown polarization. Polarization controllers based on feedback have been used in the past but these are capable of polarization adjustments of at best several kilohertz bandwidth. Polarization interleaving has been employed so that the polarization changes at the bit rate, necessitating tens to hundreds of gigahertz of polarization-acquisition bandwidth. It is desirable for an optical sampling oscilloscope to simply display the reconstructed signal power from the source signal independent of the input polarization.

Use of a polarization beam splitter that is polarized on a 45 degree axis with respect to the principal axis of the polarization beam splitter to split a pump signal into two channels is known. In this way, 50% of the pump power passes into each of the two different channels, each channel being characterized by a polarization orthogonal to the other. The source signal is also passed through the polarization beam splitter, and the two polarization components of the arbitrarily polarized source signal are split apart. Each of these two channels are passed through a corresponding nonlinear crystal to produce two corresponding mixed signals. However, this results in a 50% reduction (i.e., 3 dB loss) in conversion efficiency due to the reduced intensity of the pump signal.

The use of two nonlinear crystals in series so as to not suffer a theoretical 3 dB penalty (i.e., due to splitting the pump signal) is also known. However, the two crystals add to the cost, there is a need to employ an optical component between the two crystals to correct for color and temporal dispersion, and there is a need to match the crystals, especially their temperatures.

SUMMARY OF THE INVENTION

As an example of the invention, an apparatus includes a polarization beam splitter, at least two reflectors and first and second polarization rotation devices. The polarization beam splitter and the at least two reflectors are arranged in a loop that is capable of propagating a clockwise signal component and a counterclockwise signal component. The first polarization rotation device is located in the loop between the polarization beam splitter and a first reflector of the at least two reflectors. The second polarization rotation device is located in the loop between the polarization beam splitter and an additional reflector of the at least two reflectors. The first polarization rotation device includes a serial arrangement of a reciprocal rotator and a nonreciprocal rotator.

As an alternative example of the invention, a method includes splitting a source signal into a vertically-polarized component and a horizontally-polarized component. The method further includes propagating the horizontally-polarized component through a first polarization rotation device to obtain a vertically-polarized version of the horizontally-polarized component, and propagating the vertically-polarized version though a region and then through a second polarization rotation device to obtain a horizontally-polarized version of the vertically-polarized version. The method further includes propagating the vertically-polarized component through the second polarization rotation device to obtain a first still vertically-polarized version, and propagating the first still vertically-polarized version through the region and then through the first polarization rotation device to obtain a second still vertically-polarized version.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention processes a source signal that has arbitrary polarization though a polarization beam splitter having a predetermined polarization in a process that enables two components of the source signal to be aligned in the predetermined polarization for further processing. In a particular example of an application of the invention, an apparatus mixes a source signal of arbitrary polarization with a pump signal of a predetermined polarization in a process that is able to detect signal power in the source signal no matter what the polarization of the signal under test. As described herein, the present invention is usable to process electromagnetic signals that range from microwaves to light.

Figure 1:
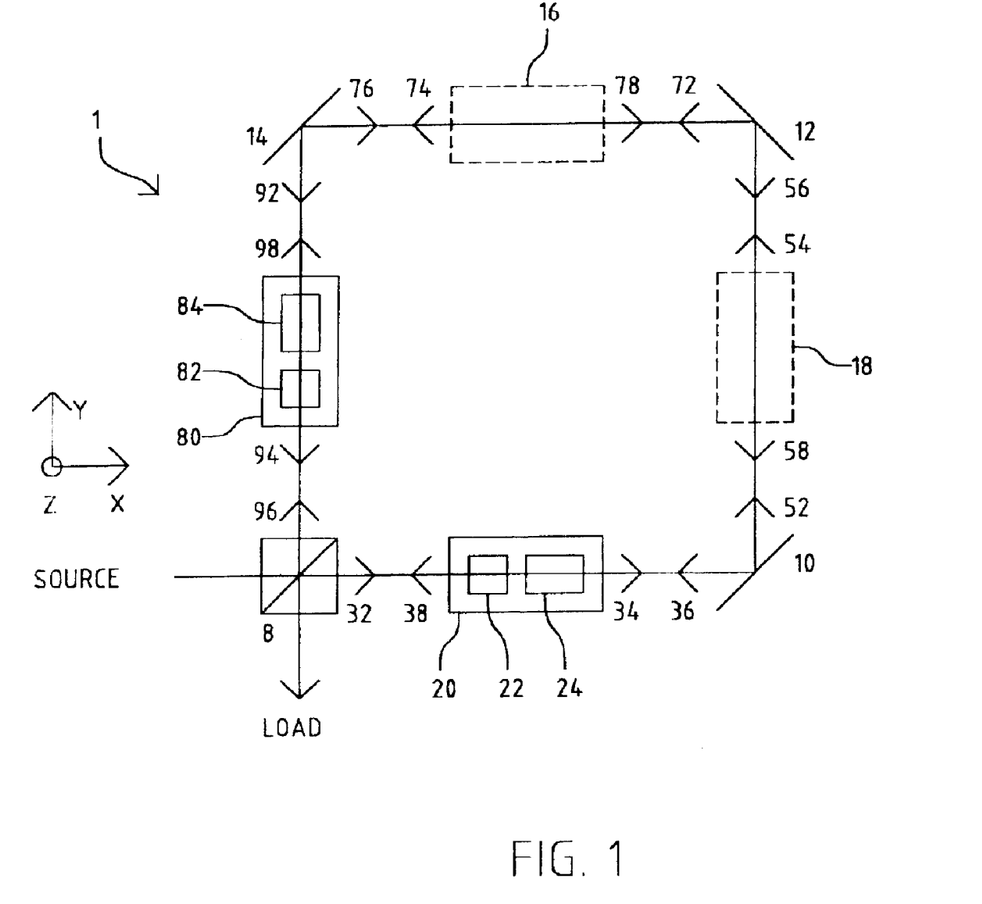
FIG. 1 is a schematic of an embodiment of the invention.

In FIG. 1, a source signal of arbitrary polarization from a SOURCE propagates through a polarization alignment apparatus 1 into a LOAD. Apparatus 1 is configured to eliminate reflections back toward the SOURCE, and at the same time, provide regions 16 and 18 where the polarization of the source signal is known. Apparatus 1 includes a polarization beam splitter 8 and reflectors 10, 12 and 14 arranged in a loop so as to be capable of splitting the source signal into two components and directing one component to propagate as a clockwise signal and the other component to propagate as a counterclockwise signal.

The source signal is of arbitrary polarization. The direction of the electric field of an electromagnetic signal, such as a light beam or microwave signal, customarily defines the polarization of the signal, although other definitions of the polarization may be used as well if used consistently. An electromagnetic signal with a planar wave front propagates in a direction perpendicular to the direction of the electric field of the signal. The polarization, as defined by the electric field, of the signal exists in a plane that is perpendicular to the direction of propagation, and the polarization may be oriented in any arbitrary direction within the plane.

Generally, the polarization vector is spoken of as having two vector components: one component is referred to as a vertically-polarized component and the other component is referred to as the horizontally-polarized component. The vertically-polarized and horizontally-polarized components combine by vector addition to form the polarization vector.

As depicted in FIG. 1, signals 32, 34, 36, 38, 72, 74, 76 and 78 propagate along the x axis in either the plus or minus direction and signals 52, 54, 56, 58, 92, 94, 96 and 98 propagate along the y axis in either the plus or minus direction. The source signal is regarded as consisting of two source signal components of mutually orthogonal polarizations.

Polarization beam splitter 8 is oriented to define a reference axis. For example, a vertical reference axis is defined by orienting the polarization beam splitter so that the horizontally-polarized component of the source signal passes through the polarization beam splitter as a horizontal source signal 32 and the vertically-polarized component of the source signal reflects from the polarization beam splitter as a vertical source signal 96. A vertical reference axis is thus defined to be parallel to the z axis.

In FIG. 1, horizontal source signal 32 propagates counterclockwise around the loop as signals 34, 52, 54, 72, 74, 92 and 94 but with polarization rotation as discussed below. Vertical source signal 96 propagates clockwise around the loop as signals 98, 76, 78, 56, 58, 36 and 38 without polarization rotation as described below.

Apparatus 1 further includes a first rotation device 20 located in the loop between polarization beam splitter 8 and reflector 10 and a second rotation device 80 located in the loop between polarization beam splitter 8 and reflector 14. Signal 32 propagates through rotation device 20 in a forward direction to become signal 34, and signal 36 propagates through rotation device 20 in a reverse direction to become signal 38. Rotation device 20 possesses the property that the polarization of a signal propagating through the rotation device in a reverse direction is not rotated; however, the polarization of a signal propagating through the rotation device in a forward direction is rotated by 90 degrees (i.e., horizontally-polarized signals become vertically-polarized, and vice versa).

In addition, signal 96 propagates through rotation device 80 in a reverse direction to become signal 98, and signal 92 propagates through rotation device 80 in a forward direction to become signal 94. Like rotation device 20, rotation device 80 possesses the property that the polarization of a signal propagating through the rotation device in a reverse direction is not rotated; whereas, the polarization of a signal propagating through the rotation device in a forward direction is rotated by 90 degrees. The construction of the rotation devices to achieve this property is discussed below.

Each of the rotation devices 20, 80 includes a reciprocal rotator (e.g., half-wave plates 22, 82) and a nonreciprocal rotator (e.g., Faraday rotators 24, 84). The reciprocal rotator preferably includes a half-wave plate with a principal axis tilted by 22.5 degrees with respect to a reference axis of the polarization beam splitter 8 that defines how orthogonally-polarized signal components are split. In reciprocal rotator 22, for example, the principal axis of the half-wave plate lies in the y-z plane and is angularly oriented with respect to the y axis and the z axis to cause the polarization of a signal propagating through the half-wave plate of rotation device 20 in a forward direction to be rotated 45 degrees clockwise and to cause a signal propagating through the half-wave plate of rotation device 20 in a reverse direction to be rotated 45 degrees counterclockwise (thus the name reciprocal rotator).

The nonreciprocal rotator preferably includes a Faraday rotator. A typical Faraday rotator includes a magnetized material characterized by the Faraday effect (i.e., Faraday material) that rotates the polarization of signals propagating through the material. However, an external magnetic field may be applied in lieu of, or in addition to, the magnetization of the Faraday material. The degree of polarization rotation of signals propagating through the Faraday material depends on the strength of the magnetization, the thickness of the material in the direction of signal propagation, and constants that characterize the particular Faraday material. In the Faraday rotator implementation of nonreciprocal rotator 24, for example, the strength of the magnetization (internal to the material or externally imposed), the thickness of the material, and material constants (depending on material type) are selected to cause the polarization of a signal (at the wavelength of the source signal) propagating through the Faraday rotator to be rotated 45 degrees. The direction of rotation is not dependent on the direction of signal propagation (i.e., whether the signal is propagating in a forward or reverse direction) through the Faraday material (thus the name nonreciprocal rotator). Whether this rotation is clockwise or counterclockwise depends on the direction of the magnetization. In the Faraday rotator of nonreciprocal rotator 24, the magnetization is oriented to cause the polarization of a signal to be rotated 45 degrees clockwise regardless of whether the signal is propagating in a forward or reverse direction.

Alternatively, the magnetization vector could be flipped, pole for pole, so that the polarization of a signal propagating through the Faraday rotator (the nonreciprocal rotator) rotates counterclockwise instead of clockwise. In this case, the reciprocal rotator 22 would have its principal axis of the half-wave plate inclined by 22.5 degrees with respect to the reference axis of the polarization beam splitter 8 to cause a signal propagating through the half-wave plate of rotation device 20 in a forward direction to be rotated 45 degrees counterclockwise and to cause a signal propagating through the half-wave plate of rotation device 20 in a reverse direction to be rotated 45 degrees clockwise.

In the forward direction through rotation device 20, signal 32 first propagates through reciprocal rotator 22, where its polarization is rotated clockwise by 45 degrees, and then propagates through nonreciprocal rotator 24 where its polarization is rotated clockwise by an additional 45 degrees. In this way, a polarization of a signal propagating through rotation device 20 in the forward direction rotates clockwise by 90 degrees. The horizontally-polarized signal 32 propagates through rotation device 20 in the forward direction to become rotated horizontal source signal 34 which is a vertically-polarized signal.

In the reverse direction through rotation device 20, signal 36 (a vertically-polarized signal) first propagates through nonreciprocal rotator 24, where its polarization is rotated clockwise by 45 degrees, and then propagates through reciprocal rotator 22 where its polarization is rotated counterclockwise by 45 degrees. In this way, a polarization of a signal propagating through rotation device 20 in a reverse direction incurs no net rotation. The vertically-polarized signal 36 propagates through rotation device 20 in the reverse direction, incurring no net polarization rotation, to become doubly unrotated vertical source signal 38 which is a vertically-polarized signal.

The order of propagation through reciprocal rotator 22 and nonreciprocal rotator 24 does not matter. A signal may propagate through reciprocal rotator 22 either before or after it propagates through nonreciprocal rotator 24. The resulting rotation is the same for signals propagating in either the forward or reverse direction.

Similarly, with respect to rotation device 80, the vertically-polarized signal 96 propagates through rotation device 80 in the reverse direction, incurring no net polarization rotation, to become unrotated vertical source signal 98. Unrotated vertical source signal 98 is a vertically-polarized signal. The vertically-polarized signal 92 propagates through rotation device 80 in the forward direction to become twice rotated horizontal source signal 94 which is a horizontally-polarized signal.

With apparatus 1 so constructed, the horizontal source signal 32 (i.e., the horizontal polarization component of the source signal) propagates through rotation device 20 in a forward direction to become rotated horizontal source signal 34. Rotated horizontal source signal 34 is actually a vertically-polarized signal since rotation device 20 rotates the polarization of signals propagating in the forward direction by 90 degrees. Rotated horizontal source signal 34 reflects off reflectors 10, 12 and 14 as vertically-polarized signals 52, 54, 72, 74 and 92 while passing through regions 18 and 16. The rotated horizontal source signal 92 is the rotated horizontal source signal 34 after having been reflected by reflectors 10, 12 and 14. The rotated horizontal source signal 92 is a vertically-polarized signal that propagates through rotation device 80 in a forward direction to become doubly rotated horizontal source signal 94. Doubly rotated horizontal source signal 94 is actually a signal with horizontal polarization since rotation device 80 rotates the polarization of signals propagating in the forward direction by an additional 90 degrees. The polarization beam splitter 8 passes the doubly rotated horizontal source signal 94 to an output, for example, into the LOAD depicted in FIG. 1.

The vertical source signal 96 (i.e., the vertical polarization component of the source signal) propagates through rotation device 80 in a reverse direction to become unrotated vertical source signal 98. Unrotated vertical source signal 98 remains vertically polarized since rotation device 80 imparts no net polarization rotation to signals propagating in the reverse direction. Unrotated vertical source signal 98 reflects off reflectors 14, 12 and 10 as vertically-polarized signals 76, 78, 56, 58 and 36 while passing through regions 16 and 18. The unrotated vertical source signal 36 (i.e., the unrotated vertical source signal 98 after having been reflected by reflectors 14, 12 and 10) remains vertically polarized and propagates through rotation device 20 to become doubly unrotated vertical source signal 38. Doubly unrotated vertical source signal 38 also remains vertically polarized since rotation device 20 imparts no net polarization rotation to signals propagating in the reverse direction. The polarization beam splitter 8 reflects the vertically-polarized doubly unrotated vertical source signal 38 to an output, for example, into the LOAD depicted in FIG. 1.

Reflectors 10, 12 and 14 reflect signals having a wavelength equal to the wavelength of the source signal, and in the present example of the invention, may or may not be reflective at other wavelengths. With apparatus 1, a vertically-polarized version of the vertical source signal 96 passes through regions 16 and 18 as a signal that propagates clockwise around the loop, and a vertically-polarized version of the horizontal source signal 32 passes through regions 18 and 16 as a signal that propagates counterclockwise around the loop.

The polarization alignment apparatus 1 receives a source signal of arbitrary polarization from a SOURCE, splits the source signal into two signal components having mutually orthogonal polarizations (defined by an orientation of the polarization beam splitter 8), aligns the two signal components into a single polarization orientation (a function of the orientation of the polarization beam splitter 8) while the two signal components propagate in opposite directions through regions 16 and 18, and then spatially overlay each other so that the two signal components, which again have orthogonal polarization, to recreate the original source signal having the original arbitrary polarization orientation of the source signal before the recombined signal is directed to an output, for example, into the LOAD.

Figure 2:
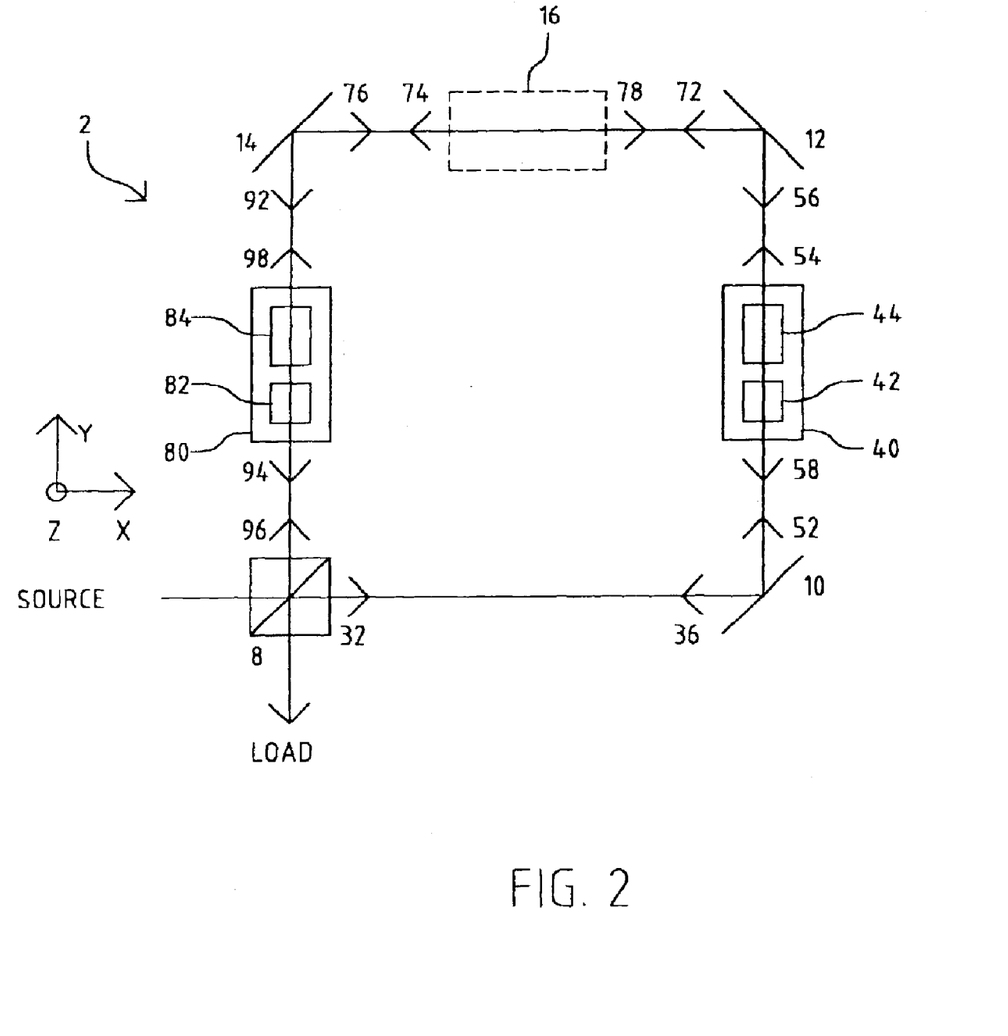
FIGS. 2 and 3 are schematics of embodiments of the invention that are alternatives to the embodiment of FIG. 1.

An alternative example of the polarization alignment apparatus is depicted in FIG. 2. In FIG. 2, a polarization alignment apparatus 2 includes substantially all of the components and processes all of the signals discussed above with respect to FIG. 1, except the rotation device denoted by numeral 20 in FIG. 1 is denoted by numeral 40 in FIG. 2. In FIG. 2, the rotation device 40 is disposed between reflectors 10 and 12 in the region denoted by numeral 18 in FIG. 1.

As with apparatus 1, the polarization alignment apparatus 2 receives a source signal of arbitrary polarization from a SOURCE, splits the source signal into two signal components having mutually orthogonal polarizations (defined by an orientation of the polarization beam splitter 8), aligns the two signal components into a single polarization orientation (a function of the orientation of the polarization beam splitter 8) while the two signal components propagate in opposite directions through region 16 (there is no region 18 in FIG. 2), and then recombines the two signal components, which again have orthogonal polarizations, to recreate the original source signal having the original arbitrary polarization orientation of the source signal before the recombined signal is directed to an output, for example, into the LOAD.

Figure 3:
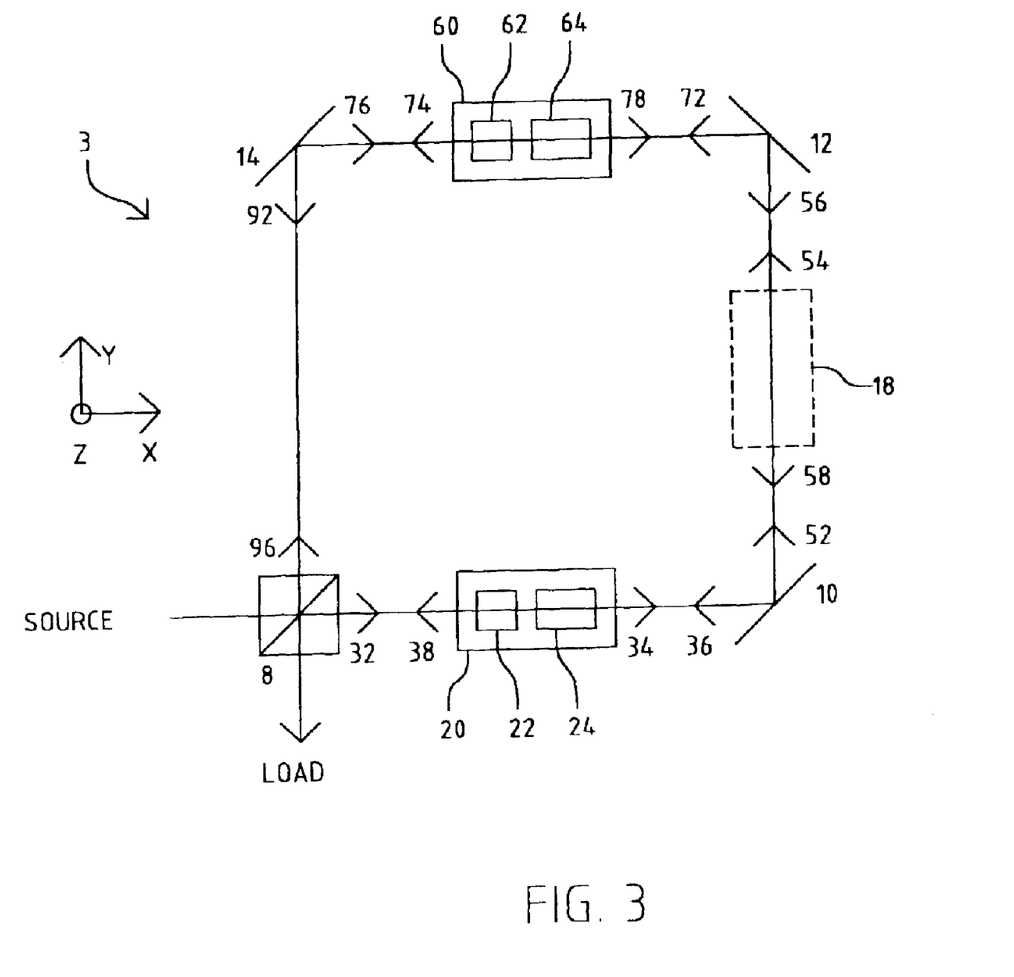

Another alternative example of the polarization alignment apparatus is depicted in FIG. 3. In FIG. 3, a polarization alignment apparatus 3 includes substantially all of the components and processes all of the signals discussed above with respect to FIG. 1, except the rotation device denoted by numeral 80 in FIG. 1 is denoted by numeral 60 in FIG. 3. In FIG. 3, the rotation device 60 is disposed between reflectors 14 and 12 in the region denoted by numeral 16 in FIG. 1.

As with apparatus 1, the polarization alignment apparatus 3 receives a source signal of arbitrary polarization from a SOURCE, splits the source signal into two signal components having mutually orthogonal polarizations (defined by an orientation of the polarization beam splitter 8), aligns the two signal components into a single polarization orientation (a function of the orientation of the polarization beam splitter 8) while the two signal components propagate in opposite directions through region 18 (there is no region 16 in FIG. 3), and then spatially overlay the two signal components, which again have orthogonal polarizations, to recreate the original source signal having the original arbitrary polarization orientation of the source signal before the recombined signal is directed into the LOAD.

With any of apparatus 1, apparatus 2 or apparatus 3, two incoming signals of the same wavelength (the source signal wavelength) that are orthogonally-polarized can be spatially overlayed and processed as a source signal from the SOURCE with two signal components, where the two signal components have mutually-orthogonal polarizations, are aligned in polarization but made distinguishable by the direction of propagation through regions 16 and/or 18.

An apparatus similar to apparatus 1, apparatus 2 or apparatus 3, may be constructed with only three sides. For example, reflector 12 and region 16 of FIG. 1 is removed and reflectors 10 and 14 are realigned to form a signal path between reflectors 10 and 14. The path between reflectors 10 and 14 is the hypotenuse of a right triangle, and region 18 is disposed along this hypotenuse. Such an arrangement is a right triangle since polarization beam splitter 8 provides two orthogonally-polarized signal components along two respective paths that are separated by a 90 degree angle.

An apparatus, such as apparatus 1, apparatus 2 or apparatus 3, may be constructed for operation with either optical signals or microwave signals. Half-wave plate rotators (e.g., 22), Faraday rotators (e.g., 24), polarization beam splitters (e.g., 8) and reflectors 10, 12 and 14 are available for use at either optical wavelengths or microwave wavelengths. The apparatus, such as apparatus 1, apparatus 2 or apparatus 3, has many uses, particularly in the processing of optical signals and microwave signals. For example, this apparatus permits a reflect-absorb filter or a transmit-absorb filter or a non-normal incidence transmit-reflect filter (e.g., independent of propagation direction) that otherwise works on signals having only one polarization to be implemented to filter arbitrarily polarized signals. This apparatus also permits a pair of traveling wave modulators (e.g., disposed separately in region 16 and region 18) that each impart a modulation on a signal propagating only in one direction to be used to independently modulate the two orthogonal signal components in order to carry twice the information. The apparatus permits an up heterodyne converter or a down heterodyne converter positioned in regions 16 and/or 18 to advantageously be used to frequency convert signals.

Figure 4:
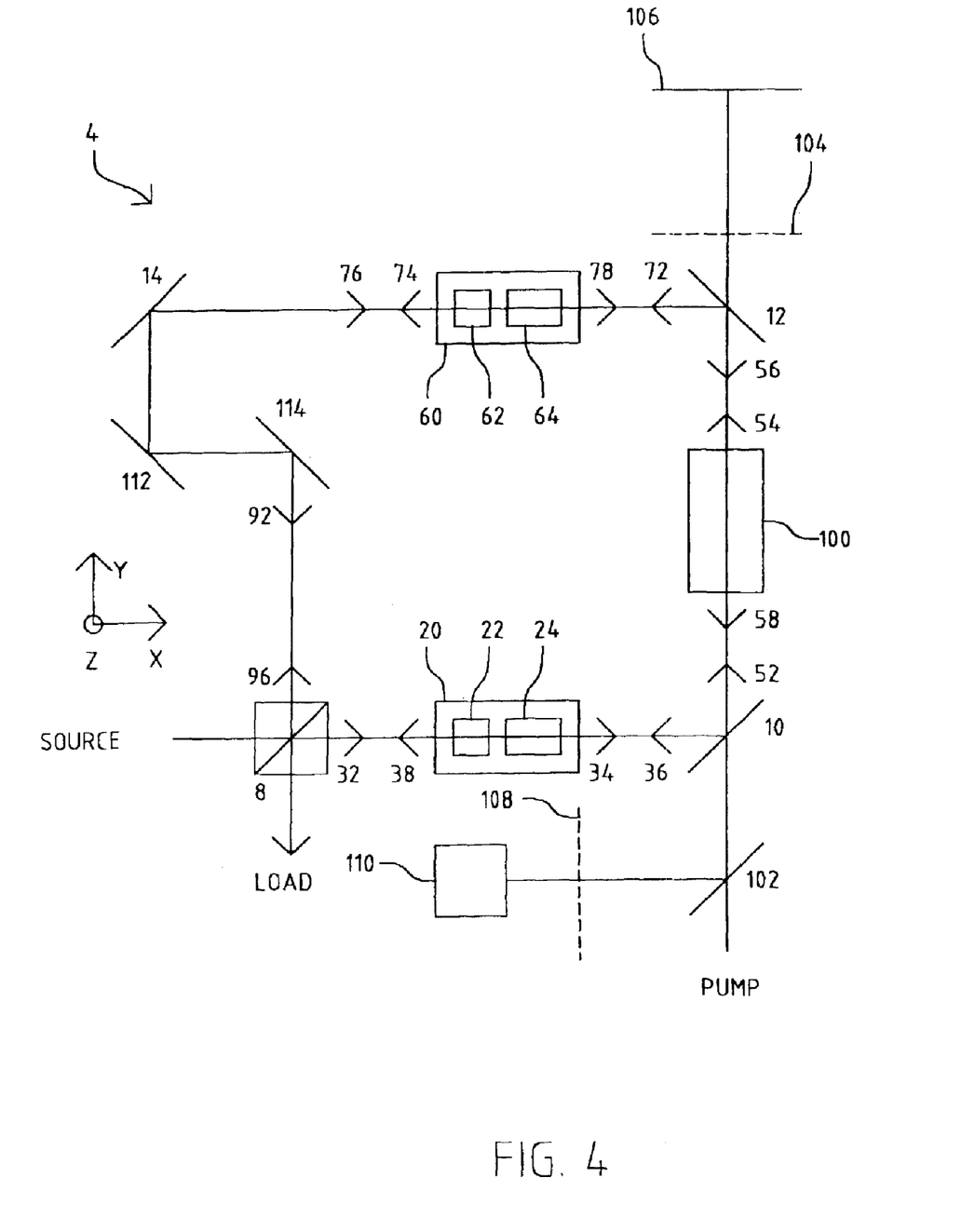
FIGS. 4 and 5 are schematics of alternative embodiments that include a nonlinear crystal.

As with all frequency converters, care is taken to imbed a pump signal (i.e., a local oscillator signal) and extract the intermediate frequency signal that results from mixing. For example, FIG. 4, shows an up heterodyne converter apparatus 4. Apparatus 4 includes substantially all of the components and processes all of the signals discussed above with respect to FIG. 3, except a nonlinear crystal 100 is disposed between reflectors 10 and 12 in the region denoted by numeral 18 in FIG. 3, a line stretcher is added, and additional circuit components are added as described below. An example of the line stretcher is the arrangement implemented by adding reflectors 112 and 114 and the possible repositioning of reflector 14. However, the line stretcher may be added at any point along the signal path from the polarization beam splitter 8 to the reflector 12. By appropriately arranging reflectors 14, 112 and 114, the delay between when signal 96 departs polarization beam splitter 8 and arrives at nonlinear crystal 100 (arrives as signal 56) can be arbitrarily stretched or contracted with respect to a delay between when signal 32 departs polarization beam splitter 8 and arrives at nonlinear crystal 100 (arrives as a vertically-polarized version 52 of the horizontal source signal 32). In this way, the arrival times at any point within nonlinear crystal 100 of signals corresponding to signals 32 and 96 can be arbitrarily temporally aligned. In fact, with a similar line stretcher added to apparatus 1, 2 or 3, the arrival times at region 16 or 18 of signals corresponding to signals 32 and 96 can be also arbitrarily temporally aligned.

In a representative application, the source signal is an optical signal typically having a 1530–1620 nm wavelength, and the pump signal is an optical signal typically having a shorter wavelength such as 780 nm. Mixing that occurs in nonlinear crystal 100 produces a sum frequency generated signal (SFG signal) having a wavelength of about 519 nm (for the wavelengths of the pump signal and the source signal discussed in this representative application). The SFG signal has a sum frequency equal to the sum of the source signal frequency and the pump signal frequency. Similarly, the heterodyne mixing can be configured, as will be described below with respect to FIG. 6, to produce a difference frequency generated signal (DFG signal). The SFG and DFG signals may be generically referred to as heterodyne signals.

Figure 6:
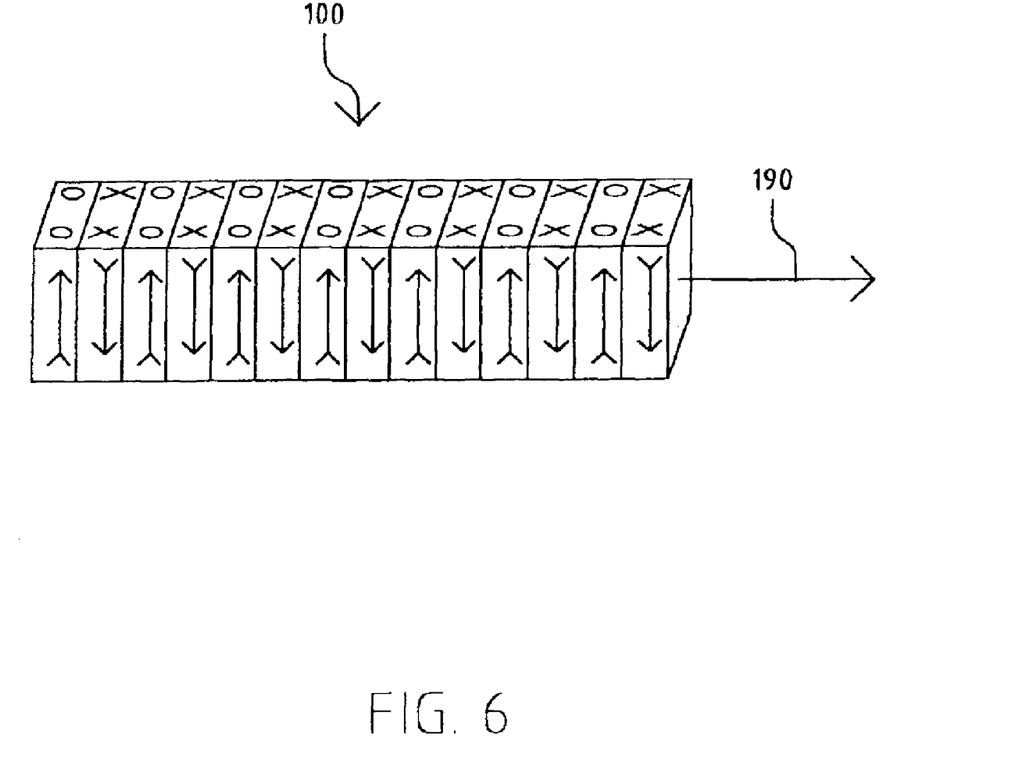
FIG. 6 is a schematic view of a periodically poled nonlinear crystal.

In one example, nonlinear crystal 100 is a periodically-poled lithium niobate (PPLN) crystal. A lithium niobate crystal has inherent polarization characteristics where one end of the crystal is characterized by a positive pole and the other end is characterized by a negative pole, thus defining a polarity therebetween. A PPLN crystal has many layers where the polarity directions reverse periodically between layers. For example, as depicted in FIG. 6, the nonlinear crystal 100 includes layers with interlayer planes generally defined to be normal to a central axis 190 (e.g., an axis aligned with the path along which pump and source signals propagate) and separated by a small extent in an axial direction along the central axis. Periodically poled means that a first half of the layers are polarized with a vector from a positive pole to a negative pole oriented from top to bottom (as depicted in FIG. 6) while a second half of the layers, interleaved with respect to the first half, are polarized with a vector from a positive pole to a negative pole oriented from bottom to top (as depicted in FIG. 6).

The spatial pole reversal rate of the polarization layers in a periodically poled nonlinear crystal is selectively depending on the wavelengths of the source signal, the pump signal and the SFG signal (i.e., so that coherent mixing produces the SFG signal). Since mixing effects in any single layer are weak, tuning the spatial pole reversal rate in such a manner permits the weak mixing in several layers to accumulate coherently. Simultaneously, any difference frequency generated by mixing is subject to destructive cancellation since the poling rate is random with respect to the difference frequency generated wavelength. The difference frequency mixing products add non-coherently and become part of the mixer noise. Alternatively, in a design in which the desired heterodyne signal is the difference frequency generated signal (DFG signal), the spatial pole reversal rate of the polarization layers in a periodically poled nonlinear crystal is selectively depending on the wavelengths of the source signal, the pump signal and the DFG signal (i.e., so that coherent mixing produces the DFG signal).

Although the above discussion uses PPLN as the nonlinear crystal 100, other nonlinear crystals may be used for diverse applications, and the choice depends largely on properties of the signals to be mixed and material properties of the crystals. For example, see Table 1 below for other nonlinear materials.

TABLE 1

| Chemical Name | Common Name |
| --- | --- |
| $Ag_3AsS_3$ | proustite |
| Te | tellurium |
| $Tl_3AsSe_3$ | TAS |
| $CdGeAs_2$ | |
| $AgGaS_2$ | |

TABLE 1-continued

| Chemical Name | Common Name |
| --- | --- |
| AgGaSe$_2$ | |
| GaAs | |
| LiNbO$_3$ | lithium niobate |
| LiIO$_3$ | lithium iodate |
| NH$_4$H$_2$(PO$_4$)$_2$ | ammonium dihydrogen phosphate, ADP |
| KH$_2$(PO$_4$)$_2$ | potassium dihydrogen phosphate, KDP |
| KD$_2$(PO$_4$)$_2$ | potassium dideuterium phosphate, KD*P |
| RbH$_2$(AsO$_4$)$_2$ | rubidium dihydrogen arsenate, RDA |
| RbH$_2$(PO$_4$)$_2$ | rubidium dihydrogen phosphate, RDP |
| NH$_4$H$_2$(AsO$_4$)$_2$ | ammonium dihydrogen arsenate, ADA |
| KD$_2$(AsO$_4$)$_2$ | potassium dideuterium arsenate, KD*A |
| CsH$_2$(AsO$_4$)$_2$ | cesium dihydrogen arsenate, CDA |
| CsD$_2$(AsO$_4$)$_2$ | cesium dideuterium arsenate, CD*A |
| KTiOPO$_4$ | potassium titanyl phosphate, KTP |
| LiCHO$_2$.H$_2$O | lithium formate monohydrate, LFM |
| KB$_5$O$_8$.4H$_2$O | potassium pentaborate, KB5 |
| | Urea |

In FIG. 4, apparatus 4 also includes a splitter 102 and a PUMP that provides a pump signal. Reflectors 10 and 12 reflect signals that have a wavelength substantially equal to the wavelength of the source signal, but reflectors 10 and 12 are substantially transparent to signals having a wavelength equal to the wavelength of the pump signal. The source signal and the spatially superimposed pump signal undergo heterodyne mixing within nonlinear crystal 100 to generate a sum frequency generated signal (SFG signal). Alternatively, the apparatus could be designed to generate the difference frequency generated signal (DFG signal) by tuning the spatial pole reversal rate to the DFG wavelength so as to coherently integrate the DFG signal in the nonlinear crystal. The SFG signal has a frequency that is the sum of the frequencies of the source signal and the pump signal. Reflectors 10 and 12 are substantially transparent to signals having a wavelength equal to the wavelength of the SFG signal (or the DFG signal for other designs). First splitter 102 is actually a wavelength-selective reflector that is substantially transparent to signals having a wavelength equal to the wavelength of the pump signal, but reflects signals that have a wavelength substantially equal to the wavelength of the SFG signal (or the DFG signal for other designs).

In FIG. 4, the pump signal from the PUMP propagates through a first splitter 102, through reflector 10, through nonlinear crystal 100 as a first-pass pump signal, through reflector 12, through equalizer 104 (discussed below) and retro-reflects off mirror 106. The retro-reflected pump signal propagates back through equalizer 104, through reflector 12 and back through nonlinear crystal 100 as a second-pass pump signal.

Within nonlinear crystal 100, the first-pass pump signal mixes with signal 52 to produce a first-pass SFG signal (or the DFG signal for other designs). The first-pass SFG signal, generated within nonlinear crystal 100, propagates through reflector 12, through equalizer 104 and retro-reflects off mirror 106. The retro-reflected first-pass SFG signal propagates back through equalizer 104, through reflector 12, through nonlinear crystal 100, through reflector 10 and deflects off first splitter 102 to propagate through filter 108 to an output, for example, detector 110 as depicted in FIG. 4. Also within nonlinear crystal 100, the second-pass pump signal mixes with signal 56 to produce a second-pass SFG signal (or the DFG signal for other designs). The second-pass SFG signal, generated within nonlinear crystal 100, propagates through reflector 10 and deflects off first splitter 102 to propagate through filter 108 into detector 110. Filter 108 is transparent to signals having a wavelength equal to the wavelength of the SFG signal, but filter 108 is either opaque to or reflective of signals having a wavelength equal to other wavelengths.

Owing to wavelength-dependent attenuation and other effects of the components of apparatus 4, the power of second-pass SFG signal that reaches detector 110 may be differentially attenuated relative to the power of the first-pass SFG signal that reaches detector 110. Equalizer 104 corrects such differential effects. The first-pass SFG signal passes through the equalizer twice. Although the second-pass SFG signal never passes though the equalizer, the second-pass SFG signal is generated proportionally to the second-pass pump signal that passes though the equalizer twice. The equalizer is constructed from mostly transparent material that exhibits differential attenuation to the different wavelengths of the SFG signal and the pump signal. The attenuation through the equalizer at the SFG signal wavelength and the attenuation through the equalizer at the pump signal wavelength are controlled separately (e.g., by wavelength selective coatings) so that the relative intensity detected at the detector 110 of the first and second pass SFG signals accurately reflects the relative intensity of the horizontally and vertically-polarized source signals from which the SFG signals are derived.

In the present example, the pump signal is a repeating pulsed sampling signal. In a representative application, the source signal is a pulsed signal where the pulse repetition rate is in the range of 10 s to 100 s of gigahertz. In the representative application, the pump signal is typically a pulse train of repeated short sampling pulses (e.g., as from a laser) having a repetition rate of, for example, 50 million pulses per second a pulse duration of about 100 femtoseconds. The pump signal is preferably provided by a laser (or other source but typically a laser such as a mode-locked laser) into apparatus 4 or 5 (FIG. 5) and is controlled to provide the pump signal with a defined polarization, a defined intensity and a defined wavelength.

For each pulse of the first-pass pump signal, a corresponding first-pass SFG signal pulse is generated. For each pulse of the second-pass pump signal, a corresponding second-pass SFG signal pulse is generated. However, a pulse of the first-pass SFG signal and a corresponding pulse of the second-pass SFG signal will not arrive at detector 110 at the same time. The components of apparatus 4, particularly nonlinear crystal 100, disperse signals in time according to their wavelengths (i.e., dispersion). In most applications, the source signal propagates faster than the pump signal, and the pump signal propagates faster than the SFG signal. The location of mirror 106 is adjusted in position so that a pulse of the first-pass SFG signal after retro-reflecting off mirror 106 passes back through nonlinear crystal 100 before, and not overlapping with, a pulse of the second-pass pump signal used to generate the corresponding pulse of the second-pass SFG signal. This will avoid undesired mixing of the second-pass pump signal with the retro-reflected first-pass SFG signal. Then, the line stretcher (reflectors 14, 112 and 114) is adjusted so that the portion of the vertical source signal 96 that produces a pulse of the second-pass SFG signal is time aligned with the portion of the horizontal source signal 32 that produces the corresponding pulse of the first-pass SFG signal.

A pulse from the first-pass SFG signal arrives at detector 110 after a corresponding pulse from the second-pass SFG signal to provide temporal separation of the pulses so that second-pass mixing does not remix the first-pass SFG signal. Nevertheless, the separation is very small, and the signal energy is still able to be sampled by detector 110.

Figure 5:
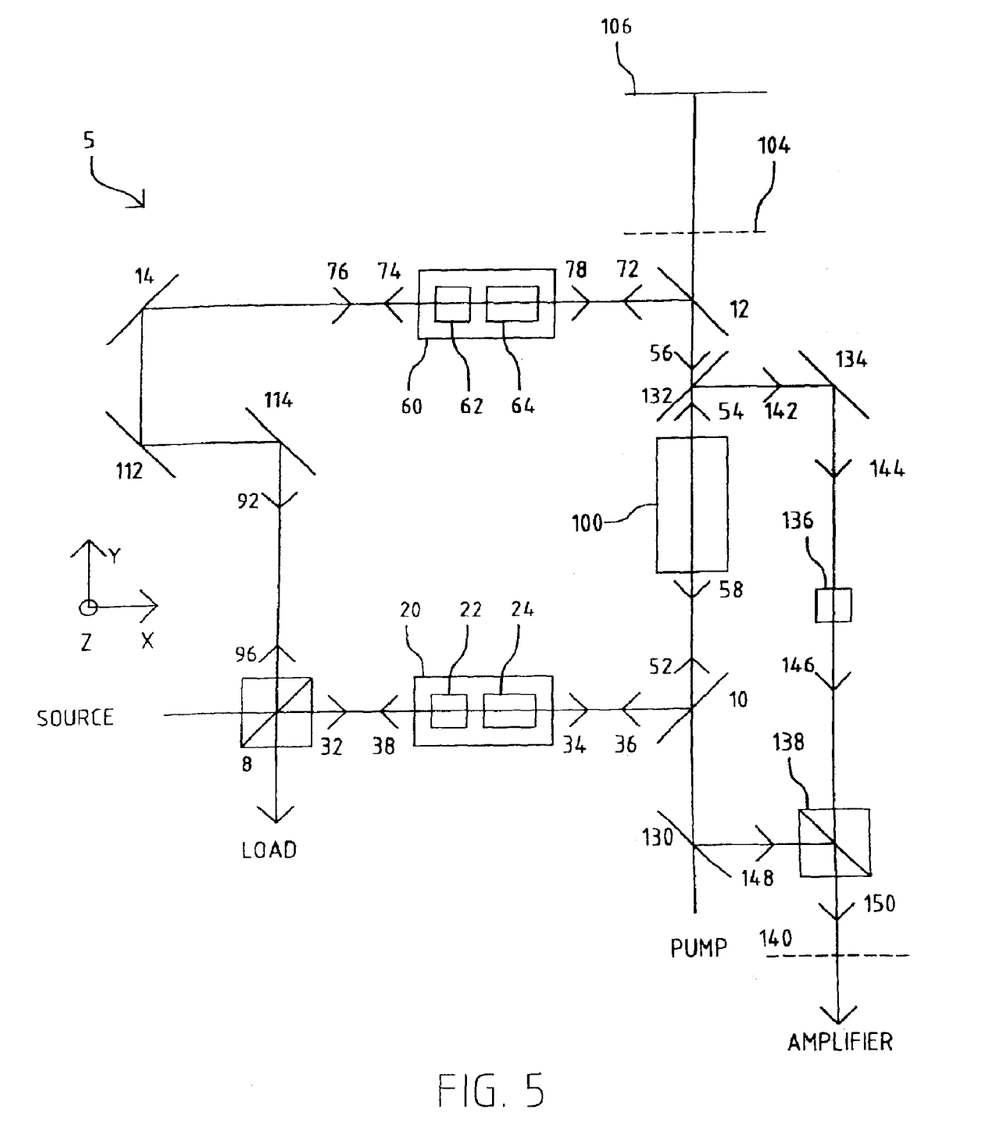

An alternative example of the invention is depicted as a down heterodyne converter apparatus 5 in FIG. 5. Apparatus 5 includes substantially all of the components and processes all of the signals discussed above with respect to FIG. 4, except additional circuit components that will be described below are added and the pump signal is a continuous wave signal. In the example discussed, the heterodyne signal that is produced is a difference frequency generated (DFG) signal instead of an SFG signal discussed above. However, apparatus 5 could be designed to produce the SFG signal by tuning the spatial pole reversal rate of the nonlinear crystal to the SFG wavelength so as to coherently integrate the SFG signal in the nonlinear crystal according to these teachings.

In apparatus 5, the first splitter 102 depicted in FIG. 4 is replaced by a first splitter 130 in FIG. 5 (oriented differently). Splitter 130 reflects signals that have a wavelength substantially equal to the wavelength of the DFG signal, but is substantially transparent to signals having a wavelength equal to the wavelength of the pump signal.

Second splitter 132 is added between reflector 12 and nonlinear crystal 100. Splitter 132 reflects signals that have a wavelength substantially equal to the wavelength of the DFG signal, but is substantially transparent to signals having a wavelength equal to the wavelength of the pump signal and the wavelength of the source signal.

Reflector 134 is added to reflect signals that have a wavelength substantially equal to the wavelength of the DFG signal, and may or may not be substantially transparent to, reflective to or absorptive of, signals at other wavelengths.

A 90 degree polarization rotator 136 is added to rotate the polarization of signals by 90 degrees for signals having a wavelength equal to the wavelength of the DFG signal. Any kind of rotator can be used (e.g., a quarter wave plate rotator) since signal propagation is one way and the rotation need be only for signals at the wavelength of the DFG signal.

A polarization beam combiner 138 (e.g., a splitter operated as a combiner) is positioned to combine the signal 148 reflected off splitter 130 with the signal 146 from rotator 136 to produce a signal 150. Polarization beam combiner 138 is like the polarization beam splitter 8 (i.e., vertically-polarized signals are reflected by, and horizontally-polarized signals propagate through, the polarization beam splitter) except that polarization beam splitter 138 operates at a wavelength equal to the wavelength of the DFG signal.

Filter 140 of FIG. 5 is merely a relocation of filter 108 of FIG. 4. Both pass signals with a wavelength equal to the heterodyne signal and block or attenuate signals having other wavelengths. In apparatus 4 discussed above, the heterodyne signal is the SFG signal, and in apparatus 5, the heterodyne signal is the DFG signal. However, apparatus 4 can be designed to produce a DFG signal, and apparatus 5 can be designed to produce an SFG signal according to these teachings.

In operation, the first-pass pump signal generates the first-pass DFG signal which is reflected by second splitter 132 to become first-pass DFG signal 142 (a vertically-polarized signal). First-pass DFG signal 142 is reflected by heterodyne signal reflector 134 and propagates through polarization rotator 136 to become rotated first-pass DFG signal 146 (a horizontally-polarized signal). The second-pass pump signal generates the second-pass DFG signal which propagates through reflector 10 to be reflected by first splitter 130 to become second-pass DFG signal 148 (a vertically-polarized signal). Second-pass DFG signal 148 is reflected by the polarization beam splitter toward filter 140, and rotated first-pass DFG signal 146 (a horizontally-polarized signal) passes through polarization beam combiner 138 toward filter 140. Second-pass DFG signal 148 spatially overlays rotated first-pass DFG signal 146 in polarization beam combiner 138 and both propagate through filter 140 toward an output such as the AMPLIFIER depicted in FIG. 5.

The line stretcher is used to ensure that the two signal components of the source signal arrive at the nonlinear crystal 100 in proper time alignment with the first and second-pass pump signals, and reflector 134, rotator 136 and polarization beam combiner 138 are moved toward or away from splitters 130, 132 in order to time realign the two signal components of the DFG signal.

In apparatus 5, neither the first-pass DFG signal nor the second-pass DFG signal pass through equalizer 104. In FIG. 5, equalizer 104 may be simply a controlled attenuator for signals at the wavelength of the pump signal. The intensity of the first-pass DFG signal is proportional to the intensity of the first-pass pump signal, and the intensity of the second-pass DFG signal is proportional to the intensity of the second-pass pump signal. Equalizer 104 can attenuate the second-pass pump signal with respect to the first-pass pump signal by any predetermined amount. Alternatively, or in combination, an attenuator (not shown) may be disposed in the path between second splitter 132, through heterodyne signal reflector 134, through 90-degree rotator 136 through to polarization beam combiner 138 that would attenuate the first-pass DFG signal relative to the second-pass DFG signal. In this way intensities of DFG signals 148 and 146 may be equalized.

With apparatus 5, heterodyne mixing of continuous (non-pulsed) signals are possible. Such an apparatus might find use in wavelength division multiplexing of, for example, optical signals. The mixing is a coherent process that faithfully reproduces the modulation of the source signal onto the modulation of the DFG signal. The output of apparatus 5 is filtered through filter 140 to propagate only the DFG signal. The DFG signal may then be amplified in an appropriately designed polarization-independent amplifier (e.g., an erbium-doped fiber amplifier).

Any of the apparatuses of FIGS. 1–5 process signals in a variety of useful ways. Referring to FIG. 1 as an example, a source signal is split in polarization beam splitter 8 into a vertically-polarized component 96 and a horizontally-polarized component 32. The horizontally-polarized component propagates through first rotation device 20 to obtain a vertically-polarized version 34 of the horizontally-polarized component 32. The vertically-polarized version 34 propagates though region 16 and/or region 18 and then through second rotation device (e.g., 60 or 80) to obtain a horizontally-polarized version (94 or 92) of the vertically-polarized version 34. The horizontally-polarized version (92 or 94) then passes through polarization beam splitter 8 into a LOAD.

The vertically-polarized component 96 propagates through the second rotation device (60 or 80) to obtain a first still vertically-polarized version (76 or 78). The first still vertically-polarized version (76 or 78) propagates through the region (18 and/or 16) and then through the first rotation device 20 to obtain a second still vertically-polarized version 38. The second still vertically-polarized version 38 is reflected from polarization beam splitter 8 into the LOAD.

The horizontally-polarized component 32, when propagating through first rotation device 20, has its polarization rotated by 90 degrees. The first still vertically-polarized version (76 or 78), when propagating through first rotation device 20, leaves its polarization unrotated.

When propagating the horizontally and vertically-polarized components in opposite directions, it is often helpful to temporally align the vertically-polarized version of the horizontally-polarized component and the first still vertically-polarized version to a predetermined time offset as they pass though region 16 and/or region 18. This is achieved using the line stretcher that includes reflectors 14, 112 and 114, or equivalents. The predetermined time offset adjusts the temporal alignment of the counterclockwise source signal with the first-pass pump signal to be the same as the temporal alignment of the clockwise source signal with the second-pass pump signal.

Heterodyne conversion of two polarization components is achieved by propagating the vertically-polarized version 52 of the horizontally-polarized component 32 and the first still vertically-polarized version 56 in opposite direction though a nonlinear crystal 100 that is disposed in region 18. The heterodyne conversion of the first polarization component is achieved by propagating a first-pass pump signal through the nonlinear crystal 100 in a same direction as the vertically-polarized version of the horizontally-polarized component propagates through the nonlinear crystal to generate a first-pass heterodyne signal. The heterodyne conversion of the second polarization component is achieved by propagating a second-pass pump signal through the nonlinear crystal in a same direction as the first still vertically-polarized version 56 propagates through the nonlinear crystal to generate a second-pass heterodyne signal.

The vertically-polarized version 52 propagates through the region 18 in which the nonlinear crystal 100 is disposed, is reflected from second source signal reflector 12, and then propagates through the second rotation device (e.g., 60). The second-pass heterodyne signal propagates through the first source signal reflector 10 as a non-reflected second-pass heterodyne signal, and the non-reflected second-pass heterodyne signal is deflected from a first splitter 102 (or 130 in FIG. 5) as a deflected second-pass heterodyne signal (148 in FIG. 5).

In FIG. 4, the first-pass heterodyne signal propagates through second source signal reflector 12 and off mirror 106 as a first retro-reflected first-pass heterodyne signal. The first retro-reflected first-pass heterodyne signal propagates through second source signal reflector 12, through the nonlinear crystal 100, through the first source signal reflector 10 as a second retro-reflected first-pass heterodyne signal. The second retro-reflected first-pass heterodyne signal deflects from first splitter 102 as a deflected retro-reflected first-pass heterodyne signal. Both the deflected retro-reflected first-pass heterodyne signal and the deflected second-pass heterodyne signal are filtered in heterodyne signal filter 108 and propagated into detector 110.

Intensities of the deflected retro-reflected first-pass heterodyne signal and the deflected second-pass heterodyne signal are equalized by equalizer 104.

In FIG. 5, the first-pass heterodyne signal is deflected by a second splitter 132 to become signal 142, reflected by heterodyne signal reflector 134 to become signal 144, and polarization rotated 90 degrees by 90-degree rotator 136 to become a rotated first-pass heterodyne signal 146. The rotated first-pass heterodyne signal 146 and the deflected second-pass heterodyne signal 148 (deflected off splitter 130) are combined in polarization beam combiner 138. Combiner 138 is similar in principal to splitter 8, but it functions to combine two orthogonally polarized signals, and it is configured to function at the wavelength of the heterodyne signals. Advantageously, the intensities of the rotated first-pass heterodyne signal 146 and the deflected second-pass heterodyne signal 148 are equalized by the time they enter combiner 138.

Having described preferred embodiments of a novel apparatus and method of mixing (which are intended to be illustrative and not limiting), it is noted that modifications and variations can be made in light of the above teachings. For example, signals produced at polarization beam splitter 8 are described as vertically and horizontally-polarized components, but these designations are arbitrary, and the two signals are actually the two orthogonal projections of the source signal defined by the orientation of splitter 8. It is therefore to be understood that changes may be made in the particular embodiments of the invention disclosed which are within the scope of the invention as defined by the appended claims.

What is claim is:

1. An apparatus comprising a polarization beam splitter, at least two reflectors, a nonlinear crystal and first and second polarization rotation devices, wherein:

the polarization beam splitter, the nonlinear crystal and the at least two reflectors are arranged in a loop that is capable of propagating a clockwise signal component and a counterclockwise signal component;

the first polarization rotation device is located in the loop between the polarization beam splitter and a first reflector of the at least two reflectors;

the second polarization rotation device is located in the loop between the polarization beam splitter and an additional reflector of the at least two reflectors; and the first polarization rotation device includes a serial arrangement comprising a reciprocal rotator and a nonreciprocal rotator.

2. The apparatus of claim 1, wherein:

the reciprocal rotator includes a half-wave plate with a principal axis tilted 22.5 degrees with respect to the reference axis of the polarization beam splitter; and the nonreciprocal rotator includes a Faraday rotator configured to be capable of rotating polarization of the clockwise signal component and the counterclockwise signal component by plus 45 degrees.

3. The apparatus of claim 1, wherein:

the at least two reflectors further includes a second reflector;

the additional reflector constitutes a third reflector of the at least two reflectors;

the polarization beam splitter, the first reflector, the second reflector and the third reflector are arranged in the loop; and the second polarization rotation device is located in the loop between the polarization beam splitter and the third reflector.

4. The apparatus of claim 1, wherein:

the additional reflector constitutes a second reflector of the at least two reflectors;

the at least two reflectors further includes a third reflector;

the polarization beam splitter, the first reflector, the second reflector and the third reflector are arranged in the loop; and the second polarization rotation device is located in the loop between the third and second reflectors.

5. The apparatus of claim 4, further comprising a line stretcher disposed between the third reflector and one of the polarization beam splitter and the second polarization rotation device, wherein the nonlinear crystal is located between the first and second reflectors.

6. The apparatus of claim 5, further comprising:
   a mirror located so that the second reflector is disposed between the nonlinear crystal and the mirror; and
   an equalizer disposed between the mirror and the second reflector.

7. The apparatus of claim 5, wherein:
   the nonlinear crystal is configured to mix a source signal at a source signal frequency with a pump signal at a pump signal frequency to provide a heterodyne signal at a heterodyne signal frequency, the heterodyne signal frequency being one of the sum and the difference of the source signal frequency and the pump signal frequency; and
   the first reflector is reflective at the source signal frequency and transparent to the pump signal frequency.

8. The apparatus of claim 7, further comprising a first splitter located so that the first reflector is disposed between the nonlinear crystal and the first splitter, wherein:
   the first reflector is further transparent at the heterodyne signal frequency;
      the second reflector is reflective at the source signal frequency and transparent at the pump signal frequency; and
      the first splitter is transparent at the pump signal frequency and reflective at the heterodyne signal frequency.

9. The apparatus of claim 8, wherein the second reflector is further transparent at the heterodyne signal frequency, the apparatus further comprising:
   a filter disposed adjacent to the first splitter; and
   a detector located so that the filter is disposed between the detector and the first splitter.

10. The apparatus of claim 8, further comprising:
    a second splitter located between the second reflector and the nonlinear crystal, wherein,
    the second splitter is reflective at the heterodyne signal frequency and transparent at both the source signal frequency and the pump signal frequency.

11. The apparatus of claim 10, further comprising:
    a heterodyne signal reflector disposed adjacent to the second splitter;
    a polarization beam combiner disposed adjacent to the first splitter; and
    a 90-degree rotator located between the heterodyne signal reflector and the polarization beam combiner.

12. An apparatus comprising a polarization beam splitter, at least two reflectors, a nonlinear crystal, a line stretcher and first and second polarization rotation devicese, wherein:
    the polarization beam splitter, the nonlinear crystal, the line stretcher and the at least two reflectors are arranged in a loop that is capable of propagating a clockwise signal component and a counterclockwise signal component;
    the first polarization rotation device is located in the loop between the polarization beam splitter and a first reflector of the at least two reflectors;
    the second polarization rotation device is located in the loop between the polarization beam splitter and an additional reflector of the at least two reflectors;
    the first polarization rotation device includes a serial arrangement comprising a reciprocal rotator and a nonreciprocal rotator;

the nonlinear crystal is located between the first reflector and the additional reflector; and
the line stretcher is located between the second polarization rotation device and one of the polarization beam splitter and the additional reflector.

13. The apparatus of claim 12, further comprising a first splitter located so that the first reflector is disposed between the nonlinear crystal and the first splitter, wherein:
   the nonlinear crystal is configured to mix a source signal at a source signal frequency with a pump signal at a pump signal frequency to provide a heterodyne signal at a heterodyne signal frequency, the heterodyned signal frequency being one of the sum and the difference of the source signal frequency and the pump signal frequency;
   the first reflector is reflective at the source signal frequency and transparent at the pump signal frequency;
   the first reflector is further transparent at the heterodyne signal frequency;
   the additional reflector is reflective at the source signal frequency and transparent at the pump signal frequency; and
   the first splitter is transparent at the pump signal frequency and reflective at the heterodyne signal frequency.

14. A method comprising:
    splitting a source signal into a vertically-polarized component and a horizontally-polarized component;
    propagating the horizontally-polarized component through a first polarization rotation device to obtain a vertically-polarized version of the horizontally-polarized component;
    propagating the vertically-polarized version though a nonlinear crystal and then through a second polarization rotation device to obtain a horizontally-polarized version of the vertically-polarized version;
    propagating the vertically-polarized component through the second polarization rotation device to obtain a first still vertically-polarized version; and
    propagating the first still vertically-polarized version through the nonlinear crystal and then through the first polarization rotation device to obtain a second still vertically-polarized version.

15. The method of claim 14, wherein:
    propagating the horizontally-polarized component through the first polarization rotation device rotates the polarization of the horizontally-polarized component by 90 degrees; and
    propagating the first still vertically-polarized version through the first polarization rotation device leaves the polarization of the second still vertically-polarized version unrotated with respect to a polarization of the first still vertically-polarized version.

16. A method comprising:
    splitting a source signal into a vertically-polarized component and a horizontally-polarized component;
    propagating the horizontally-polarized component through a first polarization rotation device to obtain a vertically-polarized version of the horizontally-polarized component;
    propagating the vertically-polarized version though a region and then through a second polarization rotation device to obtain a horizontally-polarized version of the vertically-polarized version;

propagating the vertically-polarized component through the second polarization rotation device to obtain a first still vertically-polarized version;

propagating the first still vertically-polarized version through the region and then through the first polarization rotation device to obtain a second still vertically-polarized version; and temporally aligning to a predetermined time offset the vertically-polarized version of the horizontally-polarized component and the first still vertically-polarized version as they pass though the region.

17. A method comprising:

splitting a source signal into a vertically-polarized component and a horizontally-polarized component;

propagating the horizontally-polarized component through a first polarization rotation device to obtain a vertically-polarized version of the horizontally-polarized component;

propagating the vertically-polarized version though a region and then through a second polarization rotation device to obtain a horizontally-polarized version of the vertically-polarized version;

propagating the vertically-polarized component through the second polarization rotation device to obtain a first still vertically-polarized version;

propagating the first still vertically-polarized version through the region and then through the first polarization rotation device to obtain a second still vertically-polarized version; and propagating the vertically-polarized version of the horizontally-polarized component and the first still vertically-polarized version in opposite directions through a nonlinear crystal located in the region.

18. The method of claim 17, further comprising:

propagating a first-pass pump signal through the nonlinear crystal in the same direction as that of the vertically-polarized version of the horizontally-polarized component to generate a first-pass heterodyne signal; and propagating a second-pass pump signal through the nonlinear crystal in the same direction as that of the first still vertically-polarized version to generate a second-pass heterodyne signal.

19. The method of claim 18, further comprising:

propagating the second-pass heterodyne signal through a first source signal reflector as a non-reflected second-pass heterodyne signal; and deflecting the non-reflected second-pass heterodyne signal from a first splitter as a deflected second-pass heterodyne signal.

20. The method of claim 19, further comprising:

propagating the first-pass heterodyne signal through a second source signal reflector and off a mirror as a first retro-reflected first-pass heterodyne signal;

propagating the first retro-reflected first-pass heterodyne signal through the second source signal reflector, through the nonlinear crystal, through the first source signal reflector as a second retro-reflected first-pass heterodyne signal;

deflecting the second retro-reflected first-pass heterodyne signal from the first splitter as a deflected retro-reflected first-pass heterodyne signal.

21. The method of claim 20, further comprising equalizing intensities of the deflected retro-reflected first-pass heterodyne signal and the deflected second-pass heterodyne signal.

22. The method of claim 19, further comprising:

propagating the first-pass heterodyne signal through a 90-degree polarization rotator as a rotated first-pass heterodyne signal; and combining the rotated first-pass heterodyne signal and the deflected second-pass heterodyne signal in a polarization beam combiner.

23. The method of claim 22, further comprising equalizing intensities of the rotated first-pass heterodyne signal and the deflected second-pass heterodyne signal.

24. A method comprising:

splitting a source signal into a vertically-polarized component and a horizontally-polarized component;, propagating the horizontally-polarized component through a first polarization rotation device to obtain a vertically-polarized version of the horizontally-polarized component;

propagating the vertically-polarized version though a region and then through a second polarization rotation device to obtain a horizontally-polarized version of the vertically-polarized version;

propagating the vertically-polarized component through the second polarization rotation device to obtain a first still vertically-polarized version;

propagating the first still vertically-polarized version through the region and then through the first polarization rotation device to obtain a second still vertically-polarized version;

passing the horizontally-polarized version through a polarization beam splitter; and spatially overlaying the second still vertically-polarized version and the horizontally-polarized version after passing through the polarization beam splitter.

25. An apparatus comprising a polarization beam splitter, at least three reflectors, a line stretcher and first and second polarization rotation devices, wherein:

the polarization beam splitter, the line stretcher and the at least three reflectors are arranged in a loop that is capable of propagating a clockwise signal component and a counterclockwise signal component;

the first polarization rotation device is located in the loop between the polarization beam splitter and a first reflector of the at least three reflectors;

the line stretcher is located in the loop between the polarization beam splitter and a second reflector of the at least three reflectors; and the second polarization rotation device is located in the loop between the second reflector and a third reflector of the at least three reflectors.

26. An apparatus according to claim 25, wherein the first polarization rotation device includes a serial arrangement comprising a reciprocal rotator and a nonreciprocal rotator.

27. An apparatus according to claim 1, wherein:

the nonlinear crystal is configured to mix a source signal at a source signal frequency with a pump signal at a pump signal frequency to provide a heterodyne signal at a heterodyne signal frequency; and the heterodyne signal frequency is one of the sum and the difference of the source signal frequency and the pump signal frequency.

28. An apparatus according to claim 27, wherein the first reflector is reflective at the source signal frequency and transparent to the pump signal frequency.

\* \* \* \* \*

UNITED STATES PATENT AND TRADEMARK OFFICE
CERTIFICATE OF CORRECTION

PATENT NO. : 7,012,739 B2  Page 1 of 1
APPLICATION NO. : 10/410185
DATED : March 14, 2006
INVENTOR(S) : Lee It is certified that error appears in the above-identified patent and that said Letters Patent is hereby corrected as shown below:

In column 15, line 39, delete "wherein," and insert -- wherein --, therefor.

In column 15, line 53, delete "devicese," and insert -- devices, --, therefor.

In column 17, line 60, after "signal;" insert -- and --, therefor.

In column 18, line 14, delete "component;," and insert -- component; --, therefor.

Signed and Sealed this

Twenty-fifth Day of July, 2006

JON W. DUDAS
*Director of the United States Patent and Trademark Office*